United States Patent [19]
Newell

[11] 3,955,440
[45] May 11, 1976

[54] MICRO-ADJUSTMENT APPARATUS
[75] Inventor: William H. Newell, Mount Vernon, N.Y.
[73] Assignee: The Perkin-Elmer Corporation, Norwalk, Conn.
[22] Filed: Sept. 26, 1974
[21] Appl. No.: 509,585

[52] U.S. Cl. .............................. 74/501 M; 350/310; 350/288
[51] Int. Cl.² ...................... F16C 1/10; G02B 5/08; G02B 5/12
[58] Field of Search.................. 350/310, 288, 252; 355/57; 74/501 M

[56] References Cited
UNITED STATES PATENTS

| 3,359,812 | 12/1967 | Everitt | 350/310 X |
| 3,407,018 | 10/1968 | Miller | 350/310 X |
| 3,478,608 | 11/1969 | Met | 350/310 X |
| 3,683,297 | 8/1972 | Hobart et al. | 350/310 X |
| 3,832,040 | 8/1974 | Ciabrini | 350/310 |

OTHER PUBLICATIONS
NASA Tech Brief 66–10199, May 1966.

*Primary Examiner*—Samuel Scott
*Assistant Examiner*—Parshotam S. Lall
*Attorney, Agent, or Firm*—Sal A. Giarratana; Francis L. Masselle; John K. Conant

[57] ABSTRACT

An improved micro-adjustment apparatus particularly useful with optical apparatus and the like in which a mechanical advantage of the order of 25 to 1 between an adjustment screw and a drive is obtained without lost motion thereby permitting adjustments on the order of a tenth of a micron at the output. The mechanical advantage is obtained without lost motion through bending two flexure blades rigidly attached to one another at one end.

3 Claims, 2 Drawing Figures

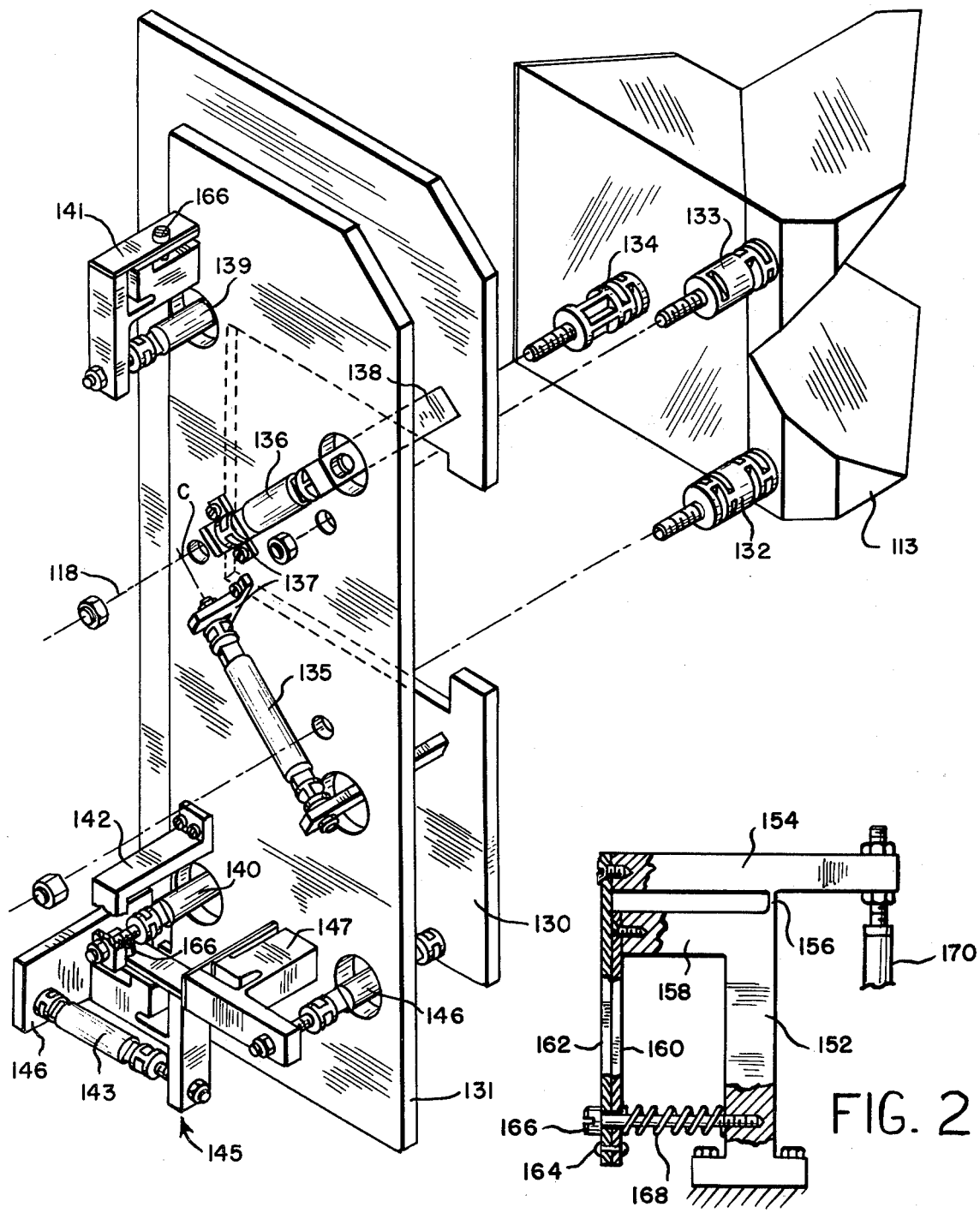

3,955,440

MICRO-ADJUSTMENT APPARATUS

BACKGROUND OF THE INVENTION

This invention relates to apparatus for making microadjustments in general, and more particularly to an improved apparatus of this type, particularly useful in optical systems.

In copending U.S. patent application Ser. No. 339,860, filed Mar. 9, 1973 and assigned to the same assignee as the present invention, an optical projection and scanning apparatus is disclosed. The apparatus disclosed therein relates to photographic apparatus useful in the manufacture of what are referred to as integrated circuits. This apparatus along with other similar apparatus requires adjustment of optical devices over very small ranges, of the order of fractions of microns. In prior art arrangements, adjustments of the type needed, for example, adjustments of prisms, have been performed using either ordinary screw adjustment or differential type screw adjustments. These prior art methods of adjustment have a roughness of the order of 0.0001 inch or 2.5 microns and in many cases, suffer from lost motion of the order of a micron or greater.

In view of the requirement in various types of apparatus for adjustments in the range of less than a micron, the need for an improved apparatus for carrying out such an adjustment is evident.

SUMMARY OF THE INVENTION

The present invention achieves the required adjustment of fractions of a micron by providing an adjustment mechanism which eliminates the effect of roughness in the prior art adjustment systems. To accomplish this, the present invention provides apparatus having a mechanical advantage of the order of 25 to 1 between an adjustment screw and a drive without lost motion. As a result, 0.001 inch of adjustment at the screw corresponds to a micron at the output of the apparatus and adjustment of 0.0001 inch on the screw will permit adjustment of 0.1 micron at the output. Essentially, this is accomplished by obtaining the mechanical advantage without lost motion through bending two flexure blades which are rigidly attached to one another at one end.

BRIEF DESCRIPTION OF DRAWINGS

FIG. 1 is a perspective view of the micro-adjustment apparatus of the present invention as used to position an optical prism.

FIG. 2 is an elevational view, partially in cross-section, of a portion of the micro-adjustment apparatus of the present invention.

DETAILED DESCRIPTION OF PREFERRED EMBODIMENT

FIG. 1 is a perspective view illustrating the microadjustment apparatus of the present invention for use in adjusting a mirror array 113. The mirror array disclosed herein is of the type used in the above identified copending application.

The mirror array 113 of FIG. 1 is one which must be susceptible of closely controlled positional adjustments in order to permit achievement of correct alignment. The array is supported on a fixed plate 130 oriented vertically. The mirror 113 is affixed to a plate 131, parallel to plate 130, by three flexure links 132, 133 and 134 which accommodate the different thermal expansions and contractions of the array and plate. The plate 131 in turn is coupled to the plate 130 by means including the micro-adjustment apparatus of the present invention which permit small closely controlled motions of the plate 131 and hence of the array 113 relative to the plate 130.

These coupling means include two flexure links 135 and 136 at right angles to each other, connected between short brackets 137 attached to plate 131 and struts 138 affixed to plate 130. Links 135 and 136 limit rotations of the plate 131 in its own plane to rotations about the point of intersection C of those links in FIG. 1, on or near the axis 118.

The coupling means additionally include two flexure links 139 and 140 disposed substantially in a vertical plane containing the axis 118, links 139 and 140 being respectively above and below that axis. Link 139 is fastened at one end to plate 130 and at the other end to the plate 131 through an adjustable flexure device 141. Link 140 is fastened at one end to plate 130 and at the other end to plate 131 through a fixed bracket 142.

Th coupling means further include a flexure link 143 at the lower end of plate 131 fastened at one end to plate 130 via a strut 146 and at the other end to plate 131 through an adjustable flexure device 145.

The coupling means lastly include a flexure link 146, fastened at one end to plate 130 and at the other end to plate 131 through an adjustable flexure device 147. The link 146 is horizontally displaced from the vertical line in which links 139 and 140 are disposed.

The adjustable flexure devices 141, 145 and 147 are of the type illustrated in FIG. 2 and permit closely-controlled, minute, backlash-free motions. Adjustment of the device 145 at its screw 166 rotates the plate 131 in its own plane about a center substantially on the axis 118. Adjustment of the device 147 at a similar screw, not visible in FIG. 1, rotates plate 131 about a vertical axis in or near the plate and passing through or near the links 139 and 140. Adjustment of device 141 at its screw 166 rotates plate 131 about a horizontal axis substantially in the plane of the plate and passing through or near the links 140 and 146.

Adjustments of devices 145 and 147 constitute two adjustments which are orthogonal, i.e., non-interfering. As the two rotations produced by adjustment of the flexure devices 145 and 147 are both about the center of curvature C, neither causes a change in focus. The third adjustment, of device 141, causes an arcuate translation of the array 113 and thereby adjusts the focus, i.e., the length of the optical path through the array 113.

As seen in FIG. 2, each of the flexure devices 141, 145 and 147, i.e., the micro-adjustment devices of the present invention, includes a stem 152 to which a lever 154 is connected through a flexure joint 156. The stem 152 has a transversely extending arm 158, which is parallel to lever 154. A first flexure blade 160 is affixed to arm 158, extending parallel to 152. A second flexure blade 162 overlies blade 160. Blade 162 is connected at one end to one end of lever 154 and is secured at the other end, as by a rivet 164, to the blade 160. A screw 166 passes with clearance through blades 160 and 162 and is threaded into stem 152. A compression helical spring 168 is disposed about screw 166 between stem 152 and blade 160.

When screw 166 is turned in, blade 160 is pinned to arm 158 of stem 152. Adjustment of the screw 166 imposes a varying curvature on the blades 160 and 162, with blade 162 having a greater or lesser radius of curvature than blade 160 accordingly as screw 166 is advanced to the right or left, as seen on FIG.2. Since the two blades are pinned together at the lower end, blade 162 will slide at its upper end by a minute amount relative to blade 160, and this motion is transferred by beam 154 to an output, indicated in FIG. 2 as a link 170. In FIG. 1, the stems of the flexure devices 141, 145 and 147 are affixed to plate 131.

By using two flexure blades 160 and 162, a mechanical advantage is obtained without lost motion through the bending of the flexure blades rigidly attached to each other at one end, making micro-adjustment of less than 1 micron possible.

Thus, an improved micro-adjustment apparatus permitting adjustments of less than 1 micron and particularly useful for adjusting high accuracy optical apparatus has been shown. Although a specific embodiment has been illustrated and described, it will be obvious to those skilled in the art that various modifications may be made without departing from the spirit of the invention which is intended to be limited solely by the appended claims.

What is claimed is:

1. Micro-adjustment apparatus for adjusting the relative position between two objects comprising:
   a stem fixed to one of said objects;
   an arm projecting from said stem;
   a lever supported by a flexure joint on said stem to be in a position normally substantially parallel to said arm and connected to the other of said objects;
   two flexure blades next to each other in parallel relation substantially transversely to said arm and to said lever, one end of one of the blades being connected to said lever and one end of the other of said blades being connected to said arm, and the other ends of said blades being joined together;
   means for displacing said other ends of the blades in directions generally parallel to said lever and said arm whereby each of the flexure blades are curved a different amount so that the blades move longitudinally different amounts and cause the lever to pivot about said flexure joint.

2. Apparatus as in claim 1 wherein said first and second blades contain a hole therethrough near said other ends wherein said means for displacing said other ends comprises a screw passing through said hole with a clearance, said stem containing internal threads therein aligned with said screw, said screw being screwed into said internal thread.

3. Apparatus as in claim 2 and further including a compression helical spring engaged about said screw between said stem and said first blade.

* * * * *